(12) United States Patent
Kellomäki

(10) Patent No.: US 9,189,864 B2
(45) Date of Patent: Nov. 17, 2015

(54) APPARATUS AND METHOD FOR CHARACTERIZING TEXTURE

(71) Applicant: Honeywell International Inc., Morristown, NJ (US)

(72) Inventor: Markku Kellomäki, Kuopio (FI)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 14/173,284

(22) Filed: Feb. 5, 2014

(65) Prior Publication Data
US 2015/0110359 A1 Apr. 23, 2015

Related U.S. Application Data

(60) Provisional application No. 61/892,277, filed on Oct. 17, 2013.

(51) Int. Cl.
| | |
|---|---|
| *G06K 9/00* | (2006.01) |
| *G06T 7/40* | (2006.01) |
| *G06K 9/52* | (2006.01) |
| *G06T 7/00* | (2006.01) |

(52) U.S. Cl.
CPC ... *G06T 7/40* (2013.01); *G06K 9/52* (2013.01); *G06T 7/0004* (2013.01); *G06T 2207/30108* (2013.01); *G06T 2207/30124* (2013.01)

(58) Field of Classification Search
None
See application file for complete search history.

(56) References Cited

U.S. PATENT DOCUMENTS

| | | | |
|---|---|---|---|
| 4,878,114 | A | 10/1989 | Huynh et al. |
| 5,374,334 | A | 12/1994 | Sommese et al. |
| 5,513,275 | A | 4/1996 | Khalaj et al. |
| 5,654,799 | A | 8/1997 | Chase et al. |

(Continued)

FOREIGN PATENT DOCUMENTS

| | | |
|---|---|---|
| CA | 2 844 414 A1 | 5/2013 |
| WO | WO 93/06300 A1 | 4/1993 |

(Continued)

OTHER PUBLICATIONS

Computer Vision—ECCV 2010 Lecture Notes in Computer Science vol. 6312, 2010, pp. 566-579 Weakly-Paired Maximum Covariance Analysis for Multimodal Dimensionality Reduction and Transfer Learning Christoph H. Lampert, Oliver Krömer.*

(Continued)

*Primary Examiner* — Andrae S Allison

(57) ABSTRACT

A method includes, using at least one processing device, obtaining an image of a surface having a texture and identifying a dominant size of the texture using a discrete auto-covariance function of the image. A first positive local maximum of the discrete auto-covariance function could be identified. The discrete auto-covariance function could include points associated with positive numbers of whole pixels, and the first positive local maximum of the discrete auto-covariance function could be identified at one of the points. Sub-pixel estimation could also be performed using the point associated with the first positive local maximum and one or more neighboring points. Performing the sub-pixel estimation could include fitting a polynomial curve to the point associated with the first positive local maximum and the one or more neighboring points and identifying a number of whole and fractional pixels associated with a maximum of the polynomial curve.

28 Claims, 10 Drawing Sheets

(56) References Cited

U.S. PATENT DOCUMENTS

| | | | |
|---|---|---|---|
| 5,865,950 | A | 2/1999 | Vinson et al. |
| 6,425,983 | B1 | 7/2002 | Marinack et al. |
| 7,545,971 | B2 | 6/2009 | Shakespeare |
| 8,840,775 | B2 | 9/2014 | Chen et al. |
| 2002/0034338 | A1 | 3/2002 | Askary |
| 2004/0264795 | A1* | 12/2004 | Fielding ............... 382/254 |
| 2007/0133878 | A1* | 6/2007 | Porikli et al. ............ 382/190 |
| 2008/0013818 | A1 | 1/2008 | Shakespeare |
| 2008/0019611 | A1 | 1/2008 | Larkin et al. |
| 2008/0205518 | A1* | 8/2008 | Wilinski et al. ......... 375/240.08 |
| 2011/0007940 | A1* | 1/2011 | Hamza et al. ............ 382/103 |
| 2011/0284178 | A1 | 11/2011 | Shakespeare |
| 2013/0116812 | A1 | 5/2013 | Drasek et al. |
| 2015/0108375 | A1 | 4/2015 | Kellomaki et al. |
| 2015/0110359 | A1 | 4/2015 | Kellomaki |

FOREIGN PATENT DOCUMENTS

| | | |
|---|---|---|
| WO | WO 95/16072 A1 | 6/1995 |
| WO | WO 2013/029546 A1 | 3/2013 |
| WO | WO 2013/070542 A1 | 5/2013 |
| WO | WO 2014/087046 A1 | 6/2014 |

OTHER PUBLICATIONS

Drabycz et al, Image Texture Characterization Using the Discrete Orthonormal S-Transform, Journal of Digital Imaging, Dec. 2009, vol. 22, Issue 6, pp. 696-708.*

Antti Paavola, et al., "Apparatus and Method for Closed-Loop Control of Creped Tissue Paper Structure", U.S. Appl. No. 14/225,703, filed Mar. 26, 2014.

Markku Kellomaki, et al., "Apparatus and Method for Measuring Caliper of Creped Tissue Paper", U.S. Appl. No. 14/222,251, filed Mar. 21, 2014.

Jukka-Pekka Raunio et al., "Simulation of creping pattern in tissue paper", Nordic Pulp and Ppaer Research Journal, vol. 27, No. 2, 2012, p. 375-381.

J. J. Pawlak, et al., "Image Analysis Technique for the Characterization of Tissue Softness", p. 231-238. (No date).

Jukka-Pekka Raunio, et al., "Variability of Crepe Frequency in Tissue Paper; Relationship to Basis Weight", Control Systems 2012, p. 23-41.

Petr Jordan, "Image-Based Mechanical Characterization of Soft Tissue using Three Dimensional Ultrasound", Aug. 2008, 137 pages.

Soon-Il An, "Conditional Maximum Covariance Analysis and Its Application to the Tropical Indian Ocean SST and Surface Wind Stress Anomalies", Jornal of Climate, vol. 16, Jun. 27, 2002 and Mar. 12, 2003, p. 2932-2938.

"Section 6: Principal Component and Maximum Covariance Analyses, Maximum Covariance Analysis (MCA)", Analysis of Climate and Weather Data, 2014, p. 69-103.

John Krumm, et al., "Local Spatial Frequency Analysis of Image Texture", 3rd International Conference on Computer Vision, Dec. 4-7, 1990, p. 354-358.

Qi Tian, et al., "Algorithms for Subpixel Registration", Computer Vision, Graphics, and Image Processing, vol. 35, No. 2, Aug. 1, 1986, p. 220-233.

Extended European Search Report dated Feb. 19, 2015 in connection with European Patent Application No. 14185598.1; 6 pages.

Extended European Search Report dated Mar. 6, 2015 in connection with European Patent Application No. 14185565.0; 6 pages.

Extended European Search Report dated Apr. 2, 2015 in connection with European Patent Application No. 14185656.7; 7 pages.

Final Office Action dated Jun. 1, 2015 in connection with U.S Appl. No. 14/225,703; 11 pages.

Lambert, et al.; "Weakly-Paired Maximum Covariance Analysis for Multimodal Dimensionality Reduction and Transfer Learning"; ECCV 2010; Part II; LNCS6312; 2010; 14 pages.

* cited by examiner

APPARATUS AND METHOD FOR CHARACTERIZING TEXTURE

CROSS-REFERENCE TO RELATED APPLICATION AND PRIORITY CLAIM

This application claims priority under 35 U.S.C. §119(e) to U.S. Provisional Patent Application No. 61/892,277 filed on Oct. 17, 2013. This provisional patent application is hereby incorporated by reference in its entirety into this disclosure.

TECHNICAL FIELD

This disclosure relates generally to measurement systems. More specifically, this disclosure relates to an apparatus and method for characterizing texture.

BACKGROUND

Many industries fabricate or process products that have texture. For example, various manufacturers operate systems that produce crepe paper. Crepe paper is tissue paper that has been "creped" or crinkled, and the crinkled surface of the crepe paper forms its texture. The amount and size of the crinkling can vary depending on the specific texture of crepe paper being manufactured. Other textured surfaces could be formed from pellets, crushed rock fragments, grooves, or any other suitable material(s).

SUMMARY

This disclosure provides an apparatus and method for characterizing texture.

In a first embodiment, a method includes, using at least one processing device, obtaining an image of a surface having a texture and identifying a dominant size of the texture using a discrete auto-covariance function of the image.

In a second embodiment, an apparatus includes at least one memory configured to store an image of a surface having a texture. The apparatus also includes at least one processing device configured to identify a dominant size of the texture using a discrete auto-covariance function of the image.

In a third embodiment, a non-transitory computer readable medium embodies a computer program. The computer program includes computer readable program code for obtaining an image of a surface having a texture. The computer program also includes computer readable program code for identifying a dominant size of the texture using a discrete auto-covariance function of the image.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 11B, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
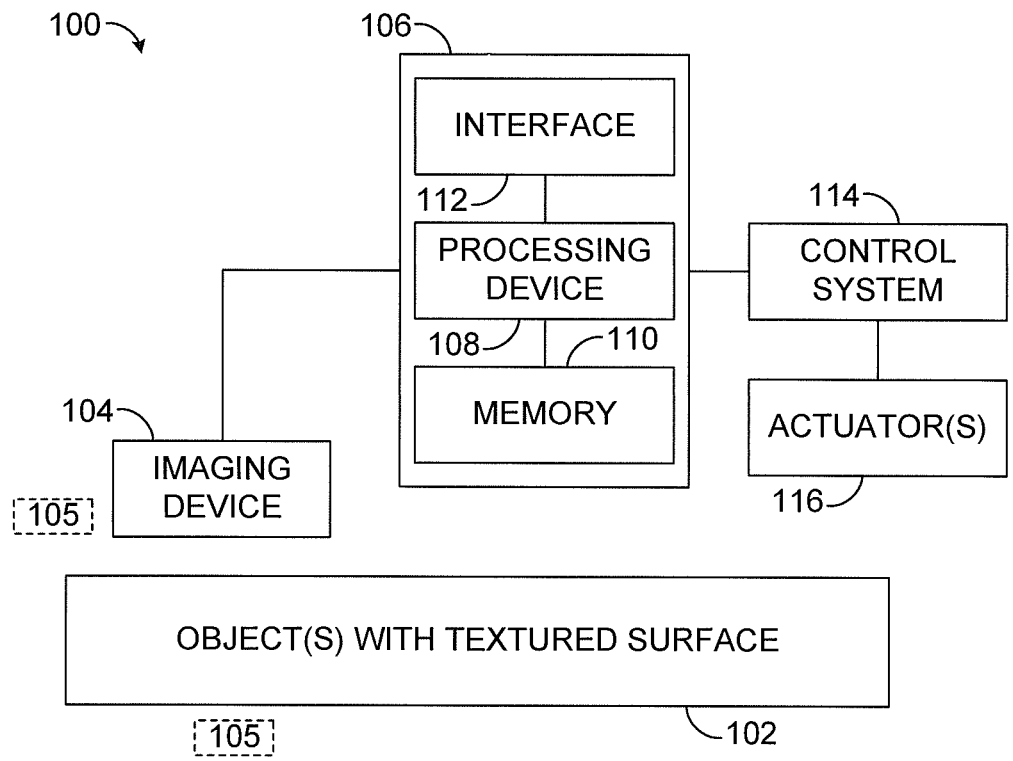
FIGS. 1 and 2 illustrate example systems that use sensors for characterizing texture according to this disclosure.
Figure 2:
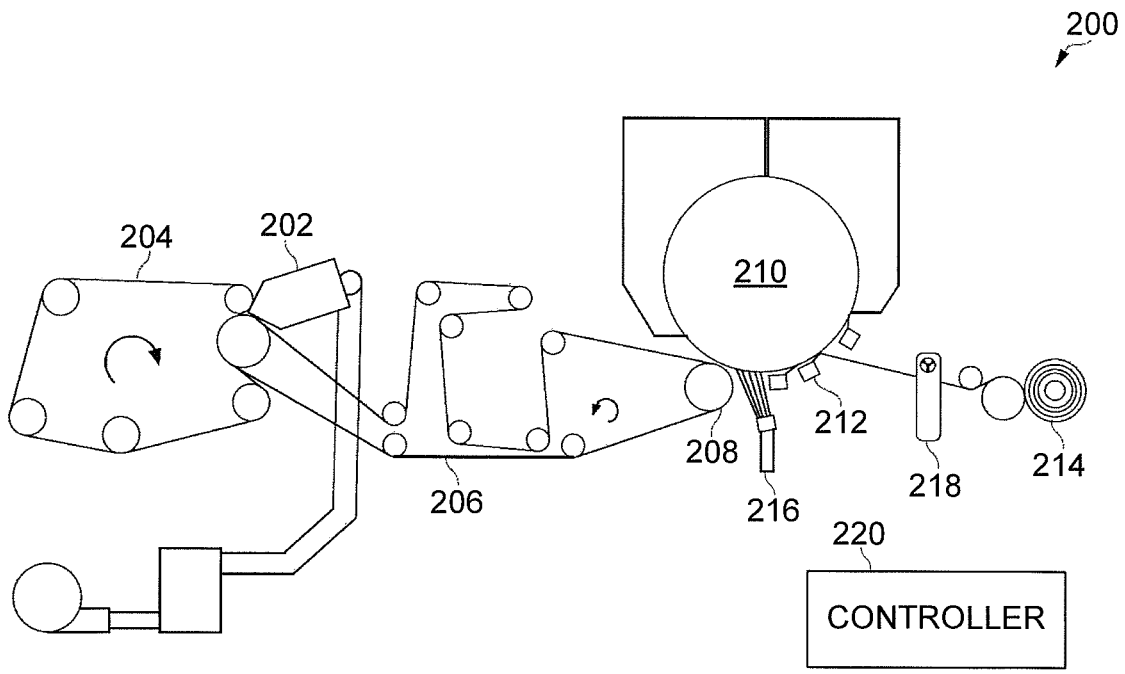

FIGS. 1 and 2 illustrate example systems 100 and 200 that use sensors for characterizing texture according to this disclosure. As shown in FIG. 1, the system 100 is used in conjunction with one or more objects 102 having a textured surface. The textured surface represents any suitable surface having some type of randomized or ordered texturing. Example textures could include the crinkled surface of crepe paper or a surface formed by pellets, crushed rock fragments, or grooves. The object(s) 102 could represent a continuous object (such as a web of crepe paper or other paper) or separate objects.

At least one imaging device 104 is used to capture digital images of textured surfaces. The imaging device 104 can use any suitable type of imaging technology to capture images. Example types of imaging devices 104 can include optical, x-ray, ultrasonic, and terahertz devices. Any dimensions of signals and images can be used, such as one-dimensional or multi-dimensional imaging. Each imaging device 104 includes any suitable structure(s) for capturing digital images. Each imaging device 104 could capture images continuously, near continuously, or intermittently.

At least one illumination source 105 could be used to illuminate the object(s) 102. The illumination can be constant or intermittent, such as during image captures by the imaging device 104. One or more illumination sources 105 can be located in any suitable positions, and the positions could depend on the object(s) 102 being illuminated. For example, pellets can be illuminated using annular illumination, creped paper can be illuminated using oblique illumination, and some textures can be illuminated using back illumination. While FIG. 1 illustrates two example positions of illumination sources 105, any number of illumination sources 105 can be used in any suitable locations. Each illumination source 105 includes any suitable structure for generating illumination, such as one or more light emitting diodes (LEDs).

Images from the imaging device 104 are provided to a processing system 106 for analysis. As described in more detail below, the processing system 106 supports a technique for accurately determining the dominant size of random or regular surface textures through digital imaging and analysis. The processing system 106 represents any suitable structure(s) capable of analyzing images to identify dominant sizes of surface textures.

The functionality for identifying the dominant size of a surface texture could be implemented using hardware only or a combination of hardware and software/firmware instructions. In this particular example, the processing system 106 includes at least one processing device 108, at least one memory 110, and at least one interface 112. Each processing device 108 represents a microcontroller, microprocessor, digital signal processor, application specific integrated circuit, field programmable gate array, discreet circuitry, or other processing device(s). The memory or memories 110 can be used to store instructions and data used, generated, or collected by the processing device(s) 108. Each memory 110 represents a volatile or non-volatile storage and retrieval device, such as a random access memory (RAM) or a Flash or other read-only memory (ROM). Each interface 112 supports communication with other devices or systems over one or more communication paths, such as a wired interface (like an Ethernet interface) or a wireless interface (like a radio frequency transceiver).

The identified dominant size of a random or regular surface texture can be used in any suitable manner. In the example shown in FIG. 1, the dominant size of a surface texture can be provided to a control system 114. The control system 114 can be used to optimize or control an industrial process that is manufacturing the object(s) 102 or that is processing the object(s) 102 in some manner. For instance, the control system 114 could control one or more actuators 116 that alter valves, motors, or other equipment within the industrial process. The control system 114 could take these actions so that objects 102 being manufactured or produced have a desired texture.

As particular examples, the control system 114 could adjust equipment used to manufacture crepe paper based on the texture (such as fold length) of the crepe paper. The control system 114 could also adjust equipment used to manufacture catalyst pellets or other pellets based on the dominant size of the pellets. The control system 114 could further adjust equipment used to crush rocks based on the dominant size of the crushed rocks. In addition, the control system 114 could adjust equipment used to create corrugation or grooves in metal or other materials based on the measured size of the grooves.

The control system 114 includes any suitable structure(s) for controlling an industrial process. Each actuator 116 includes any suitable structure(s) for adjusting at least one characteristic of an industrial process.

As shown in FIG. 2, the system 200 is used to manufacture creped tissue paper. An aqueous slurry of paper fibers is provided to a headbox 202. The headbox 202 deposits the slurry onto a substrate 204, such as a wire mesh. The substrate 204 allows water from the slurry to drain away and leave a wet web of paper fibers on the substrate 204. The substrate 204 is moved along its length in a continuous loop by multiple rollers.

The wet web of paper fibers is transferred to a press felt 206. The press felt 206 is also moved along its length in a continuous loop by multiple rollers. The press felt 206 carries the wet web of paper fibers to a pressure roll 208. The pressure roll 208 transfers the wet web of paper fibers to the surface of a Yankee dryer 210 (also called a creping cylinder). The Yankee dryer 210 dries the web of paper fibers as the Yankee dryer 210 rotates.

The dried web of paper fibers is removed from the surface of the Yankee dryer 210 by the application of a creping doctor 212. The creping doctor 212 includes a blade that forms crepe structures in the web of paper fibers. The resulting creped web of paper fibers is collected on a reel or drum 214 as creped tissue paper.

A spray boom 216 sprays material, such as a sizing agent, onto the Yankee dryer 210 before the wet web of paper fibers contacts the Yankee dryer 210. The sizing agent helps to hold the wet web of paper fibers against the Yankee dryer 210. The amount of creping produced by the creping doctor 212 depends in part on the amount of sizing agent applied to the Yankee dryer 210 by the spray boom 216.

A scanner 218 includes one or more sensors that measure at least one characteristic of the manufactured crepe paper. For example, the scanner 218 could include one or more sensors for measuring the surface texture of the crepe paper. Any additional characteristic(s) of the crepe paper could also be measured. Each sensor in the scanner 218 could be stationary or move across part or all of the width of the manufactured crepe paper. The scanner 218 can use the technique described below to measure the texture of the crepe paper.

The scanner 218 includes any suitable structure(s) for measuring at least the texture of crepe paper. For example, the scanner 218 could include the imaging device(s) 104, illumination source(s) 105, and processing system 106 shown in FIG. 1 and described above. However, the processing system 106 could also reside remotely from the scanner 218, and the scanner 218 could include the imaging device(s) 104 and illumination source(s) 105 and provide captured images of the remote processing system 106. Also, some processing functions could be performed at the scanner 218, and other processing functions could be performed at the remote processing system 106.

In some embodiments, the scanner 218 can provide texture measurements to a controller 220, which can adjust the manufacturing or other process(es) based on the texture measurements. For example, the controller 220 could adjust the operation of the creping doctor 216 (such as the angle of the creping doctor blade) or the headbox 202 based on the texture measurements. The controller 220 includes any suitable structure for controlling at least part of a process.

In particular embodiments, the functionality for measuring surface texture can be incorporated into a FOTOSURF surface topography sensor available from HONEYWELL INTERNATIONAL INC. For example, software or firmware instructions for performing the technique described in this patent document could be loaded onto at least one memory device in the FOTOSURF sensor and executed. The modified FOTOSURF sensor could then be used with the appropriate orientation and backing to measure surface texture.

Although FIGS. 1 and 2 illustrate examples of systems that use sensors for characterizing texture, various changes may be made to FIGS. 1 and 2. For example, the functional divisions shown in FIGS. 1 and 2 are for illustration only. Various components in each figure could be combined, further subdivided, or omitted and additional components could be added according to particular needs. Also, FIG. 2 illustrates a simplified example of one type of system that can be used to manufacture crepe paper. Various details are omitted in this simplified example since they are not necessary for an understanding of this disclosure. In addition, as noted above, a scanner or sensor for measuring texture can be used with any suitable object or material and is not limited to use with crepe paper systems or systems in which the identified texture size is provided to a controller or control system. The systems shown in FIGS. 1 and 2 use the scanners/sensors to measure texture in an online manner in industrial settings. The same or similar scanners/sensors could be used to measure textures in other settings, such as when used in laboratory instruments or consumer products.

FIGS. 3A through 5B illustrate example textures according to this disclosure. Images of these example textures could be captured by the imaging device 104 and analyzed by the processing system 106 as described below in order to identify the dominant texture size of the textures.

Figure 3A:
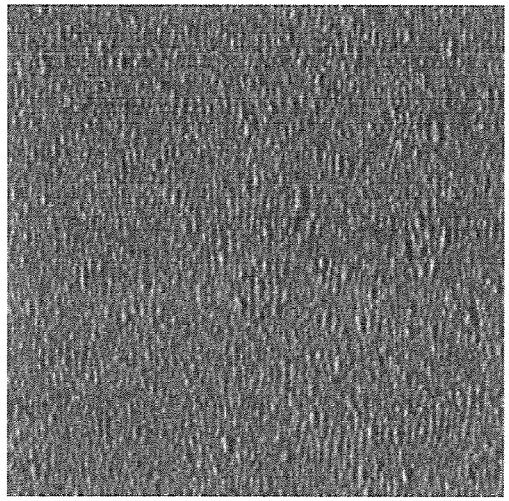
FIGS. 3A through 5B illustrate example textures according to this disclosure.
Figure 3B:
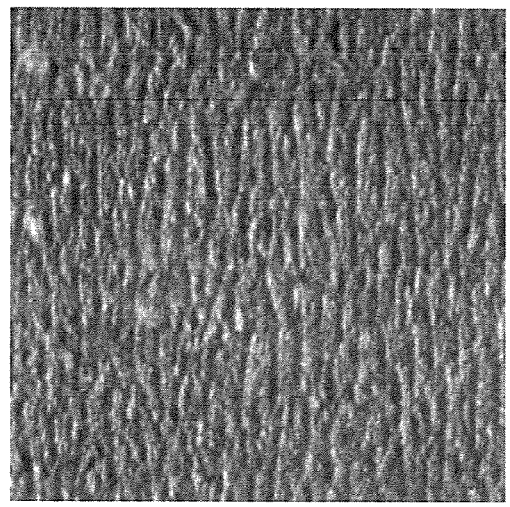
Figure 3C:
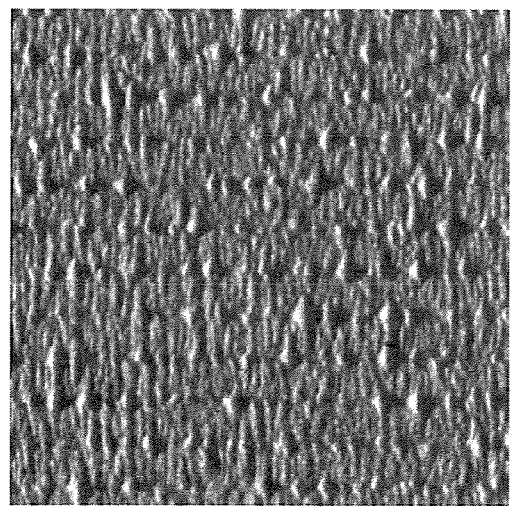

FIGS. 3A through 3C illustrate example textures of crepe paper. In particular, FIG. 3A illustrates crepe paper having finer or smaller folds, FIG. 3B illustrates crepe paper having coarser or medium-sized folds, and FIG. 3C illustrates crepe paper having much coarser or larger folds. In these figures, the larger or dominant texture features can be referred to as "macro" crepe, while smaller texture features can be referred to as "micro" crepe. In FIG. 3B, the crepe paper has medium-sized dominant features (macro crepe) with little texture features smaller than the dominant features (small amount of micro crepe). In FIG. 3C, the crepe paper has large-sized dominant features (macro crepe) with many texture features smaller than the dominant features (large amount of micro crepe).

Figure 4A:
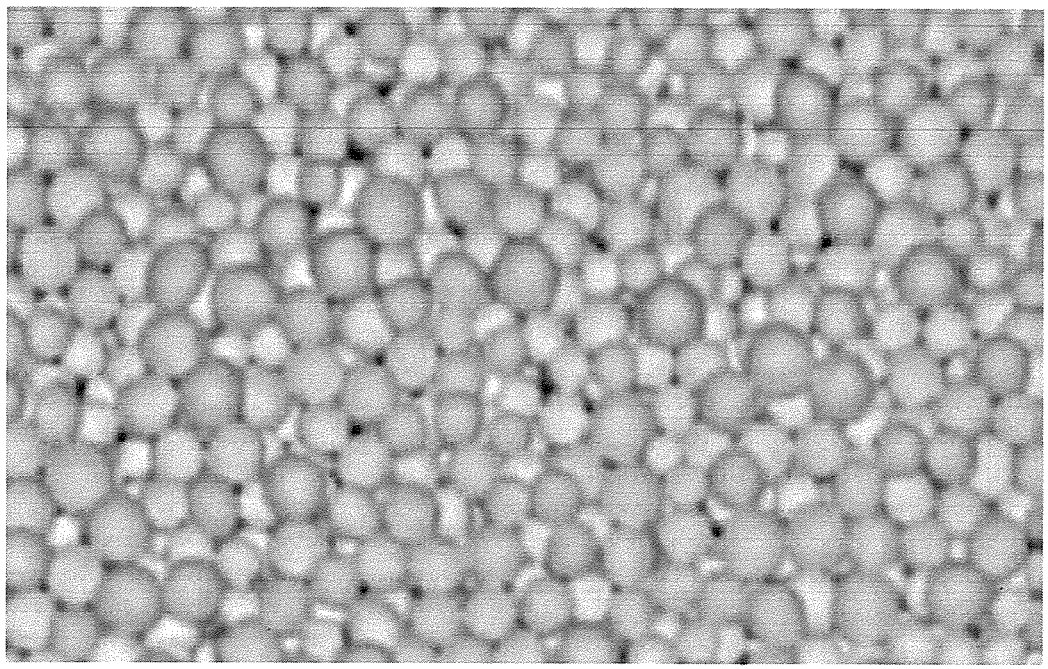
Figure 4B:
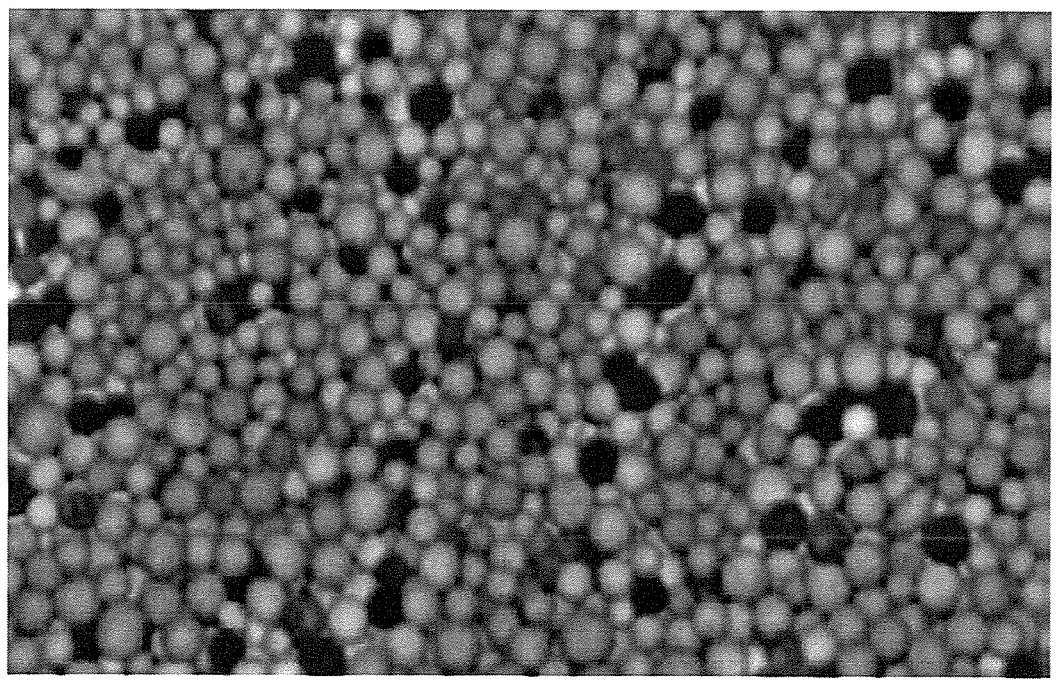

FIGS. 4A and 4B illustrate example textures of pellets or rocks. In FIG. 4A, the pellets or rocks have a more consistent color and a more consistent size. In FIG. 4B, the pellets or rocks have different colors and a less consistent size.

Figure 5A:
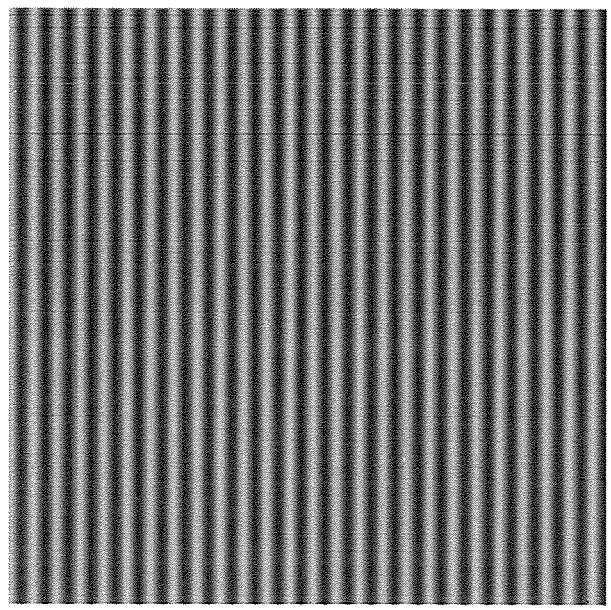
Figure 5B:
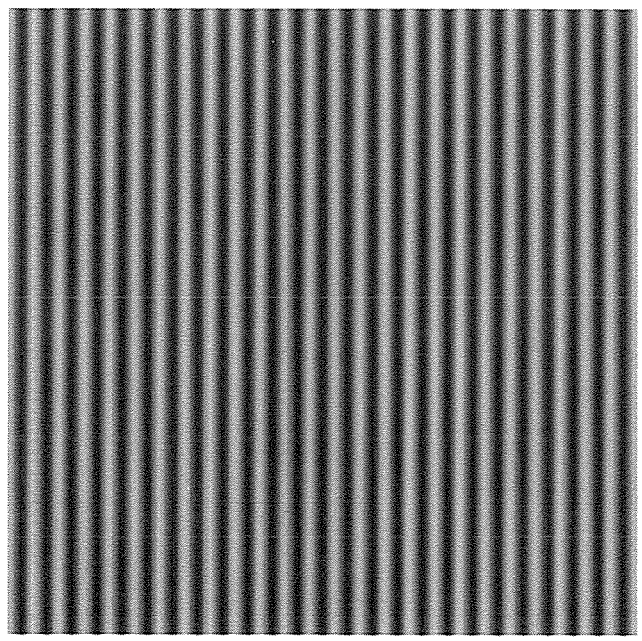

FIGS. 5A and 5B illustrate example textures formed by grooves. The textures here differ in the widths of the grooves, with the texture in FIG. 5B having slightly wider grooves than the texture in FIG. 5A.

The technique described below can be used to determine the dominant texture size for any of the textures shown in FIGS. 3A through 5B or any other textured surfaces. This technique is more reliable and robust compared to conventional approaches. For example, this technique is generally robust to image noise in the digital images. Also, the results obtained using this technique are more reliable, accurate, and computationally efficient compared to conventional approaches. In addition, this technique is more adaptable and versatile compared to conventional approaches in that a scanner or sensor need not be tuned to a particular type of texture in order to identify the dominant texture size.

Although FIGS. 3A through 5B illustrate examples of different textures, various changes may be made to FIGS. 3A through 5B. For example, crepe paper, pellets, rocks, and grooves could have any other suitable textures. Also, the textures shown in FIGS. 3A through 5B are examples only. The dominant size of other types of textures could be determined using the technique disclosed in this patent document.

Figure 6:
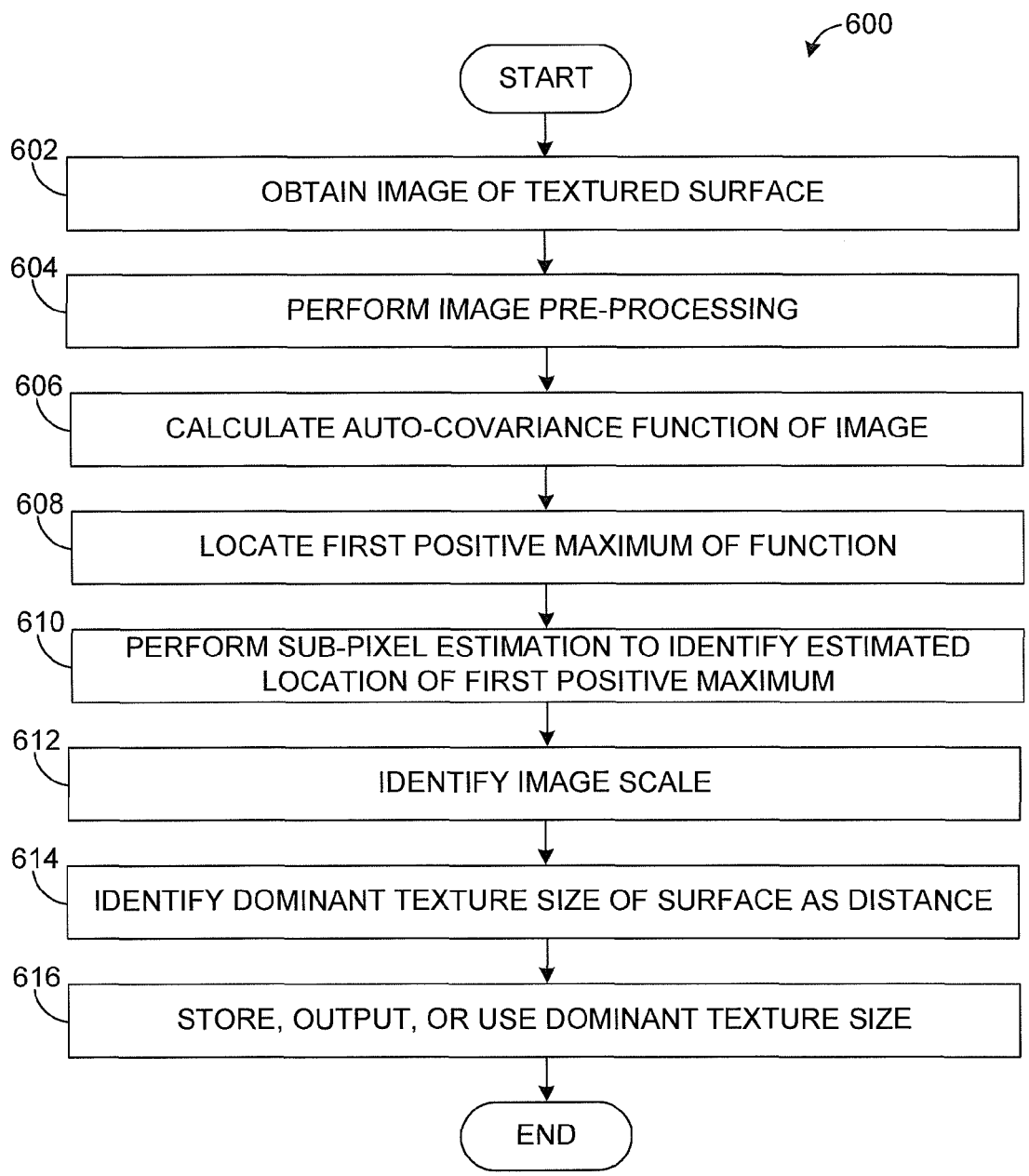
FIG. 6 illustrates an example method for characterizing texture according to this disclosure.

FIG. 6 illustrates an example method 600 for characterizing texture according to this disclosure. For ease of explanation, the method 600 is described with respect to the system 100 of FIG. 1. The method 600 could be used with any other suitable system, such as the system 200 of FIG. 2.

As shown in FIG. 6, an image of a textured surface is obtained at step 602. This could include, for example, the processing system 106 obtaining an image of the textured surface of the object(s) 102 from the imaging device 104. The image could represent a one-dimensional or multi-dimensional image. In some embodiments, the image can be captured using any suitable illumination, such as annular illumination, oblique illumination, or any other illumination based on the object(s) 102 being imaged. The image can be captured at an angle of substantially 90° with respect to the object(s) 102.

Image pre-processing occurs at step 604. This could include, for example, the processing system 106 digitally correcting the image for any unevenness in the illumination of the object(s) 102. This could also include the processing system 106 digitally correcting the image for any tilting of the imaging device 104 or the object(s) 102. Any other or additional optical, geometrical, or statistical corrections could be performed, such as to compensate for optical aberrations, vignetting, depth of focus, and temperature-dependent noise. This could further include the processing system 106 identifying different characteristics of the imaging device 104 or the obtained image. Example characteristics can include the distance of the imaging device 104 from the object(s) 102, the focal length and zoom of the imaging device 104 when the image was captured, and the chip or sensor type of the imaging device 104.

Various techniques are known in the art for identifying the tilt and the distance of an imaging device from an object. In one example technique, a known pattern of illumination (such as three spots) can be projected onto the object(s) 102, and the imaging device 104 can capture an image of the object(s) 102 and the projected pattern. The pattern that is captured in the image varies based on the tilt of the object(s) 102 or imaging device 104 and the distance of the object(s) 102 from the imaging device 104. As a result, the captured image of the pattern can be used to identify the tilt angles of the object(s) 102 in two directions with respect to the imaging device 104, as well as the distance of the object(s) 102 from the imaging device 104. Note, however, that there are various other techniques for identifying tilt and distance of an object with respect to an imaging device, and this disclosure is not limited to any particular technique for identifying these values.

An auto-covariance function of the image is identified at step 606. This could include, for example, the processing system 106 generating a discrete auto-covariance function using the pre-processed image data. A discrete auto-covariance function of an image can be determined in various domains, such as the spatial domain or the frequency domain (like after a fast Fourier transform or other transform). A discrete auto-covariance function can be generated to represent the similarity of or relationship between the gray level of adjacent pixels, pixels that are separated by one pixel, pixels that are separated by two pixels, and so on in a particular direction. The direction could represent a row or column of a Cartesian coordinate system or a radial direction of a polar coordinate system. The resulting functions can then be averaged, such as for all rows/columns or in all radial directions, to create a final discrete auto-covariance function. The final auto-covariance function can be defined using a series of discrete points, such as where the discrete points are defined as values between −1 and +1 (inclusive) for whole numbers of pixels.

Note that the phrase "auto-covariance" can be used interchangeably with "auto-correlation" in many fields. In some embodiments, the auto-covariance function represents an auto-covariance function normalized by mean and variance, which is also called an "auto-correlation coefficient."

In particular embodiments, for one-dimensional discrete data, an auto-covariance function (auto-correlation coefficient) in the spatial domain can be expressed as:

$$R(\tau) = \frac{E[(X_t - \mu)(X_{t+\tau} - \mu)]}{\sigma^2}$$

where E denotes an expected value operator, $X_t$ denotes the data value at index (time) t, τ denotes the distance (time lag) between data points, μ denotes the mean value of the data points, and $\sigma^2$ denotes the variance of the data points. In the above equation, a second-order stationary process is assumed.

In other particular embodiments, for two-dimensional discrete data, the auto-covariance function (auto-correlation coefficient) in the spatial domain for the $j^{th}$ row of a two-dimensional gray level image as a function of pixel distance k can be expressed as:

$$R_j(k) = \frac{1}{(n-k)\sigma^2} \sum_{i=1}^{n-k} (g_{i,j} - \mu)(g_{i+k,j} - \mu)$$

where k is less than n, μ denotes the mean gray level of the image, and $\sigma^2$ denotes the variance in gray level of the image. The average auto-covariance function for the image rows can then be calculated as:

$$\overline{R(k)} = \frac{1}{m} \sum_{i=1}^{m} R_i(k)$$

Note that the mean auto-covariance function (auto-correlation coefficient) as a function pixel distance is not limited to use with rows of pixel data. Rather, it can be calculated with any dimension or direction in an image.

An auto-covariance function in the frequency domain could be computed using the Wiener-Khinchin theorem in a one-dimensional case as:

$$G(f)=\text{FFT}[X_t-\mu]$$

$$S(f)=G(f)G^*(f)$$

$$R(\tau)=\text{IFFT}[S(f)]$$

Here, FFT[ ] denotes a Fast Fourier Transform, IFFT[ ] denotes an Inverse Fast Fourier Transform, and $G^*$ denotes the complex conjugate of G. This technique can also be used in each row, column, or other direction of a two-dimensional image. An average of the auto-covariance functions of multiple lines can be computed to obtain the average auto-covariance function of an image efficiently. This technique can be applied to any discrete data with any dimension or direction.

A position of the first positive local maximum of the auto-covariance function (when moving away from the origin) is identified at step 608. This could include, for example, the processing system 106 identifying a positive number of whole pixels associated with the first positive local maximum of the auto-covariance function. This position can be denoted $x_p$.

Sub-pixel estimation is performed to identify a more accurate position of the first positive local maximum of the auto-covariance function at step 610. This could include, for example, the processing system 106 performing a curve-fitting algorithm using the discrete points at and around the $x_p$ position to identify a fitted polynomial. As a particular example, the processing system 106 could fit a second-order polynomial to the discrete point at the $x_p$ position and the discrete points closest to the $x_p$ position. The maximum value of the fitted polynomial is identified, and the position of that maximum value is used as the sub-pixel estimate of the auto-covariance function. The sub-pixel estimate represents the dominant texture size contained in the obtained image expressed as a number of pixels (both whole and fractional pixels).

At this point, the sub-pixel estimate can be used in any suitable manner. In this example, an image scale is identified at step 612. This could include, for example, the processing system 106 determining a real-world distance corresponding to each pixel in the obtained image. The real-world distance can be based on various factors, such as the distance of the imaging device 104 from the object(s) 102, the focal length and zoom of the imaging device 104 when the image was captured, and the chip or sensor type of the imaging device 104. The real-world distance can also be determined using a calibration target of a known size. The dominant texture size in terms of distance is identified at step 614. This could include, for example, the processing system 106 multiplying the sub-pixel estimate identified earlier (which represents the dominant texture size expressed as a number of pixels) and the image scale (which represents the distance each pixel represents). The resulting value expresses the dominant texture size as a measure of length.

The dominant texture size can be stored, output, or used in any suitable manner at step 616. This could include, for example, the processing system 106 storing the dominant texture size in the memory 110 or outputting the dominant texture size via the interface 112. This could also include the control system 114 altering a manufacturing or processing system based on the dominant texture size.

Although FIG. 6 illustrates one example of a method 600 for characterizing texture, various changes may be made to FIG. 6. For example, while shown as a series of steps, various steps in FIG. 6 could overlap, occur in parallel, occur in a different order, or occur multiple times. As a particular example, it is possible to have both pre-processing of the image and post-calculation adjustment to the dominant texture size.

FIGS. 7A through 11B illustrate examples of characterizing texture according to this disclosure. More specifically, FIGS. 7A through 11B illustrate examples of characterizing texture using the method 600 shown in FIG. 6 and described above.

Figure 7A:
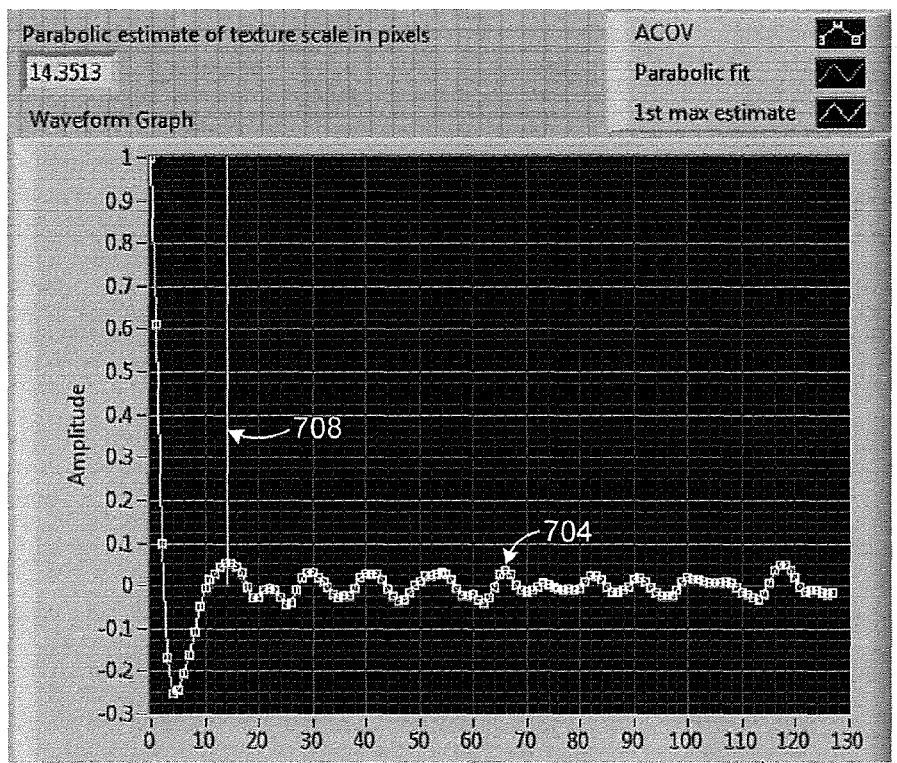
FIGS. 7A through 11B illustrate examples of characterizing texture according to this disclosure.
Figure 7B:
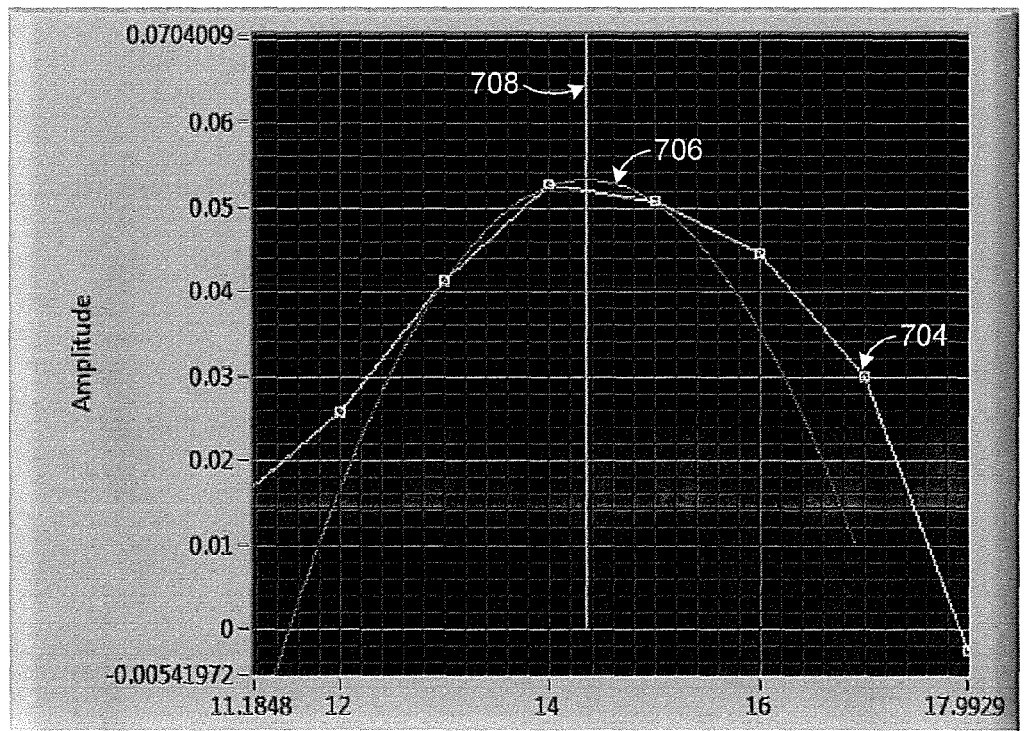

FIGS. 7A and 7B illustrate two graphs 700-702 that could be generated using the image of the texture shown in FIG. 3C. In FIG. 7A, the graph 700 includes various discrete points 704, which represent the values of a discrete auto-covariance function. As can be seen here, the first positive local maximum that is encountered when moving away from the origin occurs at a pixel distance of 14. The processing system 106 then fits a polynomial curve 706 against the point 704 at that pixel distance and its neighboring points 704. The maximum value of the polynomial curve 706 is denoted with a line 708, which also represents the dominant texture size expressed in terms of pixels. In this example, the dominant texture size represents 14.3513 pixels. By calculating the distance per pixel, the dominant texture size can then be expressed as a length.

Figure 8A:
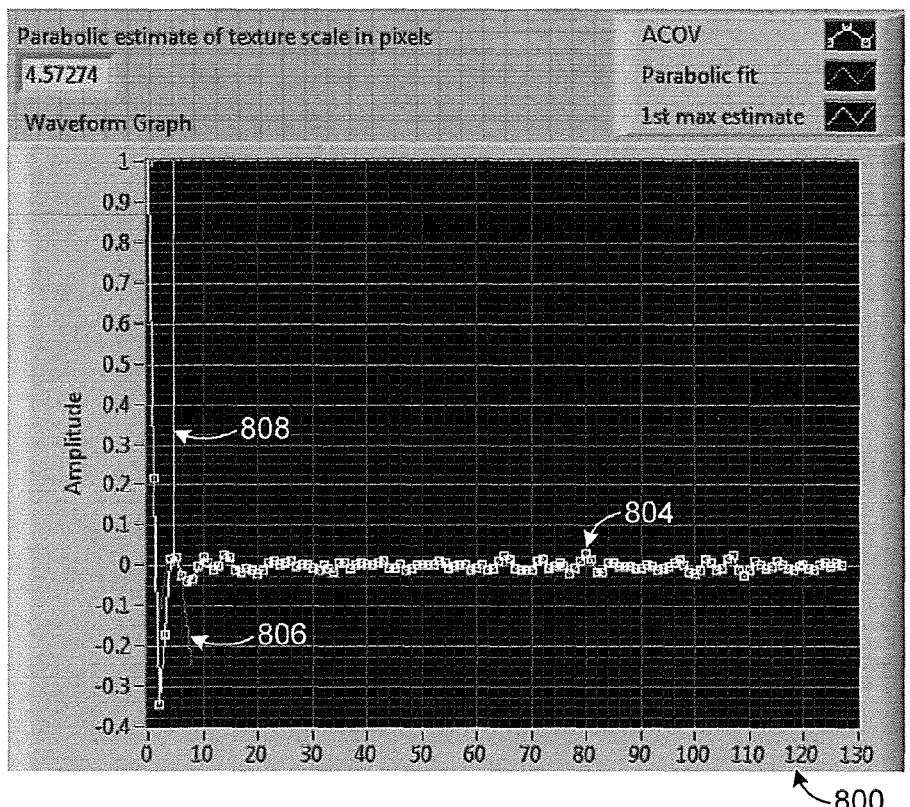
Figure 8B:
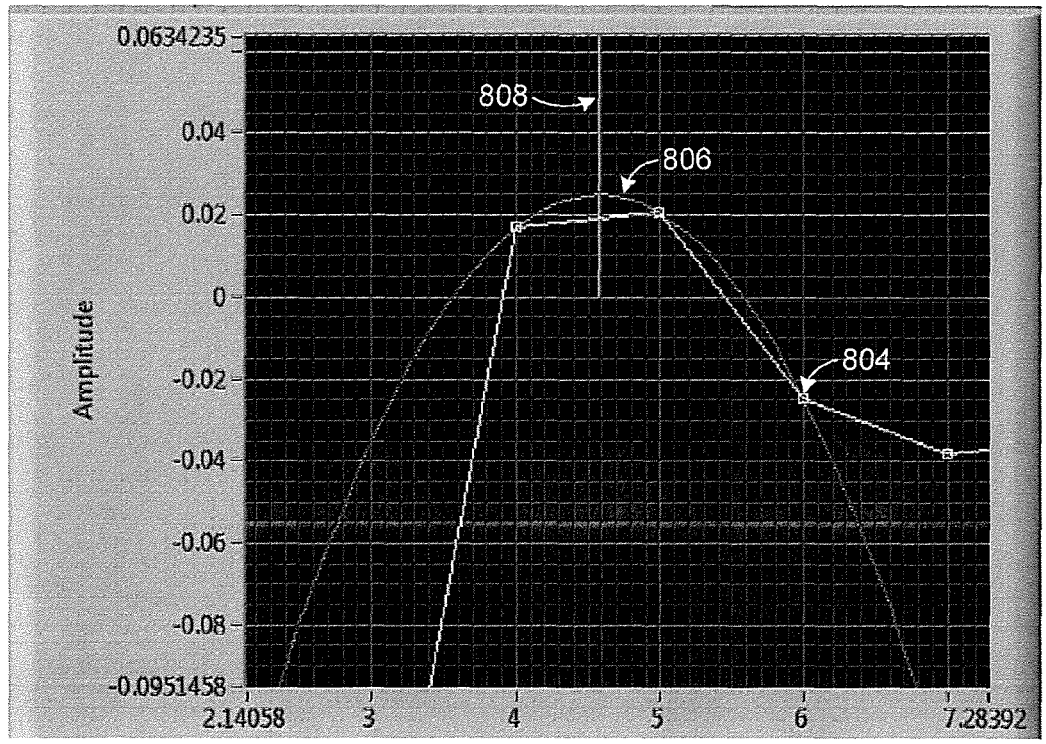

FIGS. 8A and 8B illustrate two graphs 800-802 that could be generated using the image of the texture shown in FIG. 3A. In FIG. 8A, the graph 800 includes various discrete points 804, which represent the values of a discrete auto-covariance function. As can be seen here, the first positive local maximum that is encountered when moving away from the origin occurs at a pixel distance of 5. The processing system 106 then fits a polynomial curve 806 against the point 804 at that pixel distance and its neighboring points 804. The maximum value of the polynomial curve 806 is denoted with a line 808, which also represents the dominant texture size expressed in terms of pixels. In this example, the dominant texture size represents 4.57274 pixels. By calculating the distance per pixel, the dominant texture size can then be expressed as a length.

Figure 9A:
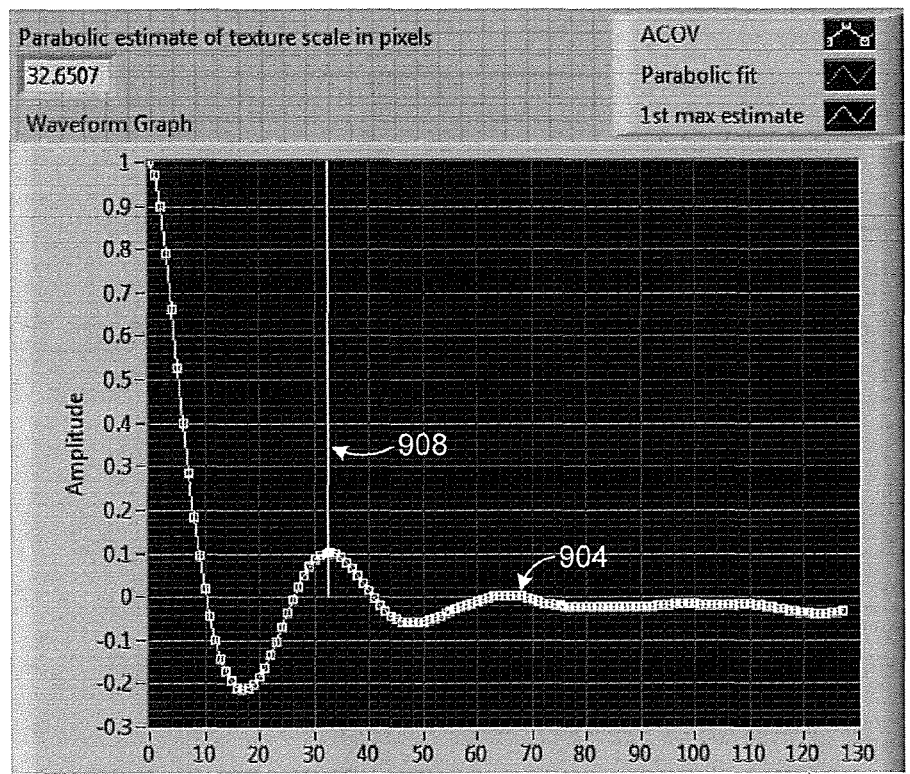
Figure 9B:
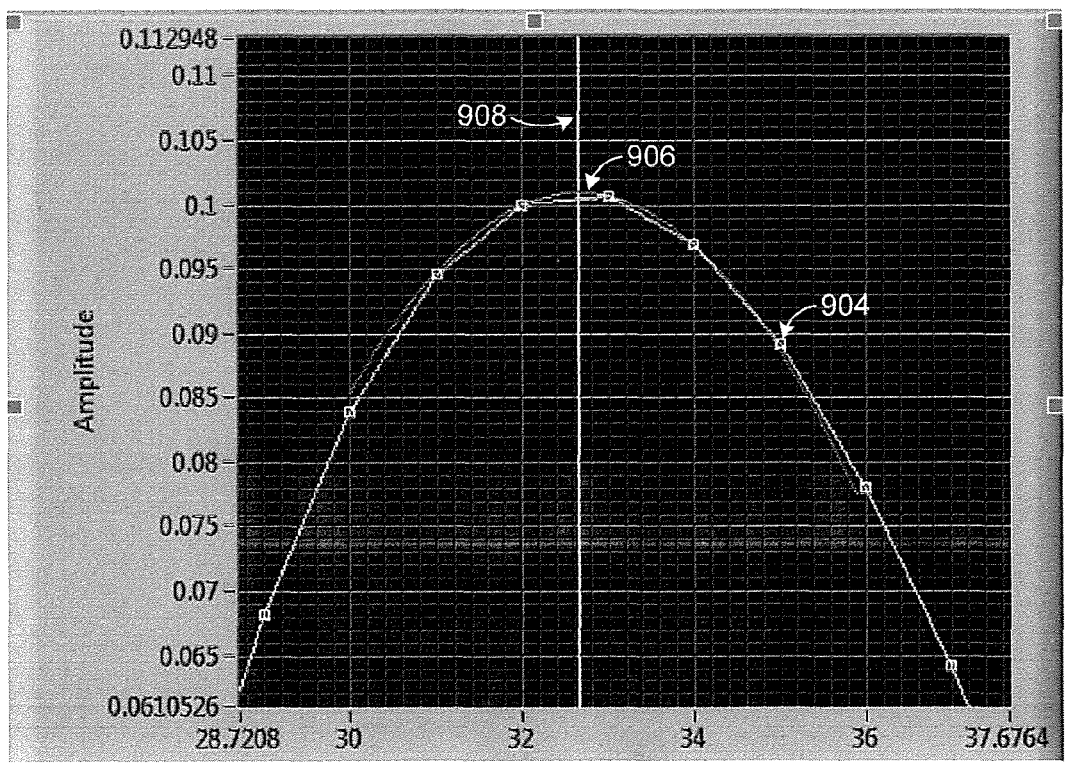

FIGS. 9A and 9B illustrate two graphs 900-902 that could be generated using the image of the texture shown in FIG. 4A. In FIG. 9A, the graph 900 includes various discrete points 904, which represent the values of a discrete auto-covariance function. As can be seen here, the first positive local maximum that is encountered when moving away from the origin occurs at a pixel distance of 33. The processing system 106 then fits a polynomial curve 906 against the point 904 at that pixel distance and its neighboring points 904. The maximum value of the polynomial curve 906 is denoted with a line 908, which also represents the dominant texture size expressed in terms of pixels. In this example, the dominant texture size represents 32.6507 pixels. By calculating the distance per pixel, the dominant texture size can then be expressed as a length.

Figure 10A:
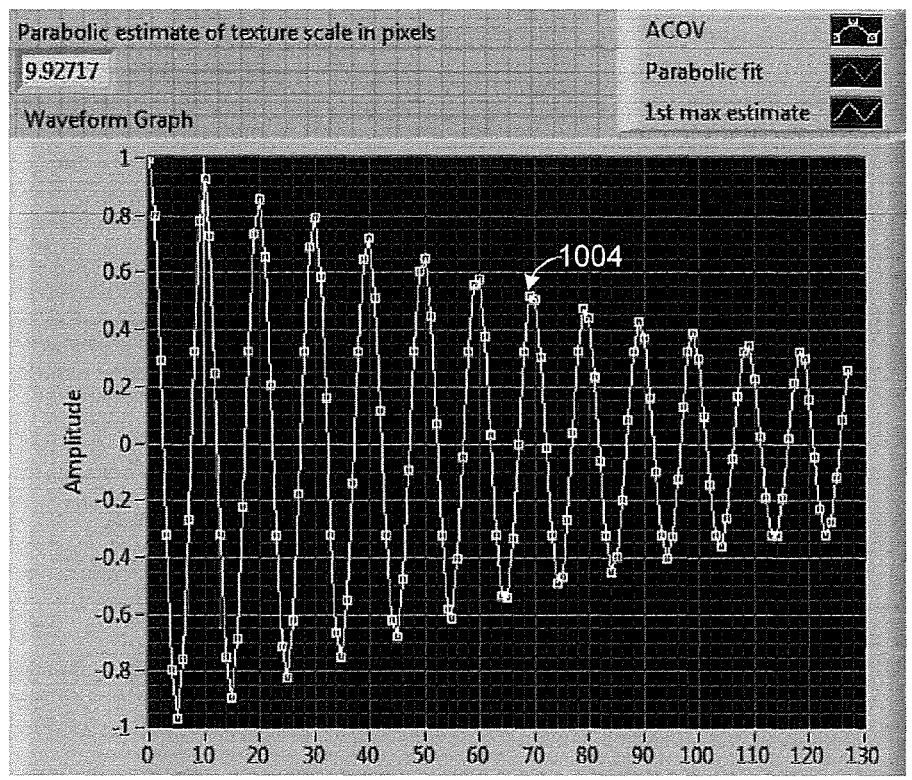
Figure 10B:
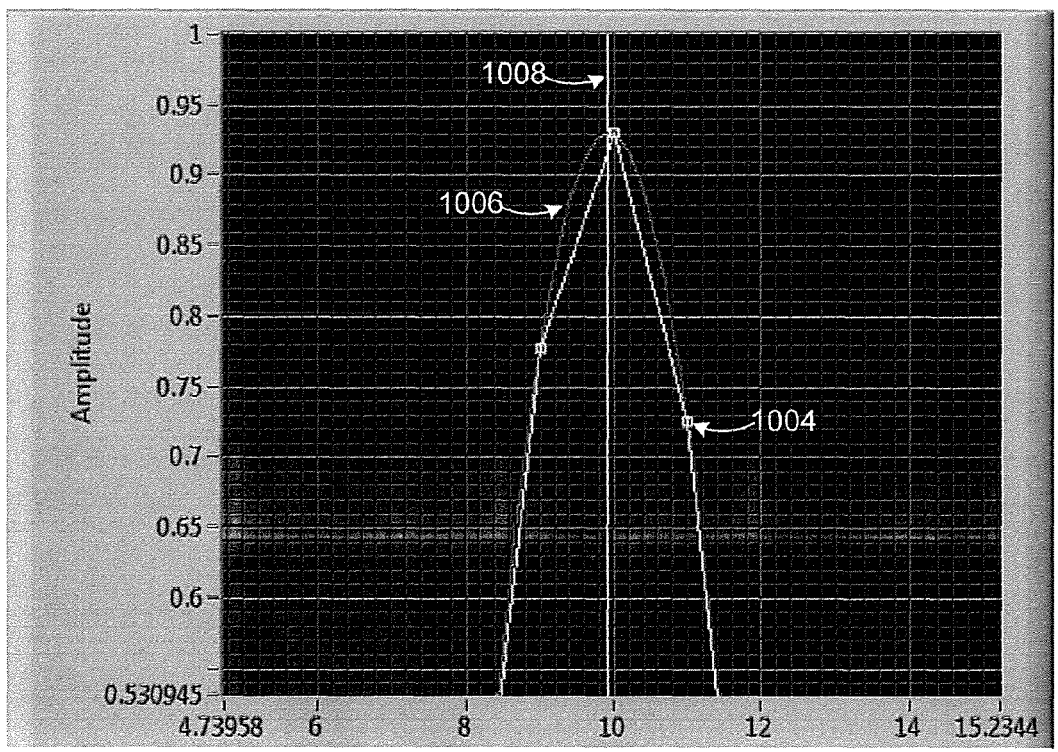

FIGS. 10A and 10B illustrate two graphs 1000-1002 that could be generated using the image of the texture shown in FIG. 5A. In FIG. 10A, the graph 1000 includes various discrete points 1004, which represent the values of a discrete auto-covariance function. As can be seen here, the first positive local maximum that is encountered when moving away from the origin occurs at a pixel distance of 10. The processing system 106 then fits a polynomial curve 1006 against the point 1004 at that pixel distance and its neighboring points 1004. The maximum value of the polynomial curve 1006 is denoted with a line 1008, which also represents the dominant texture size expressed in terms of pixels. In this example, the dominant texture size represents 9.92717 pixels. By calculating the distance per pixel, the dominant texture size can then be expressed as a length.

Figure 11A:
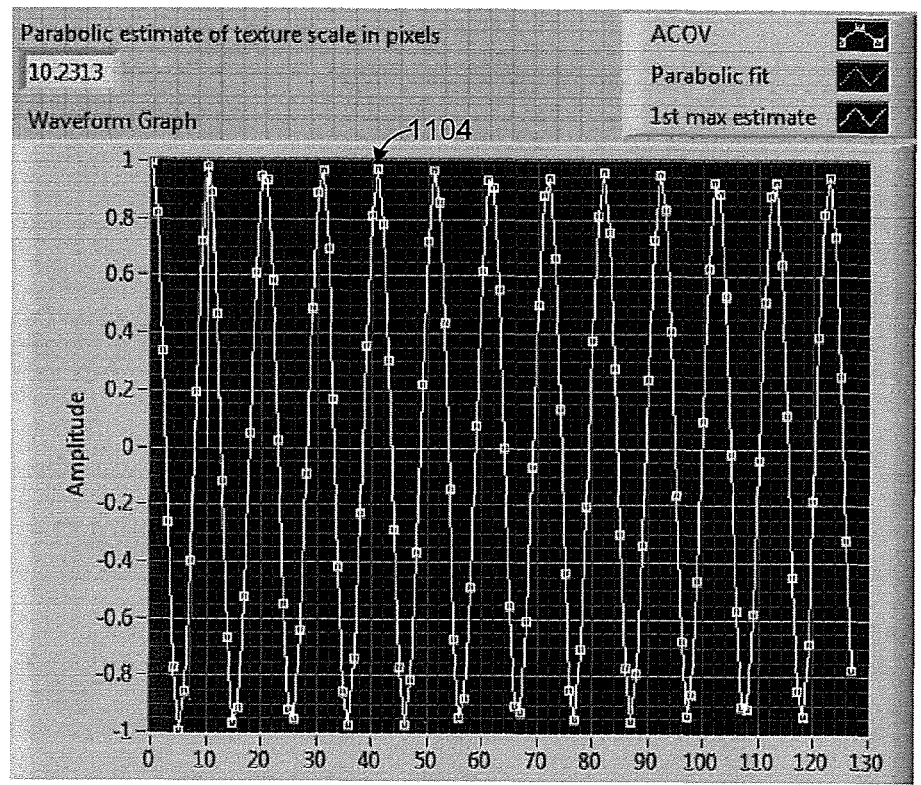
Figure 11B:
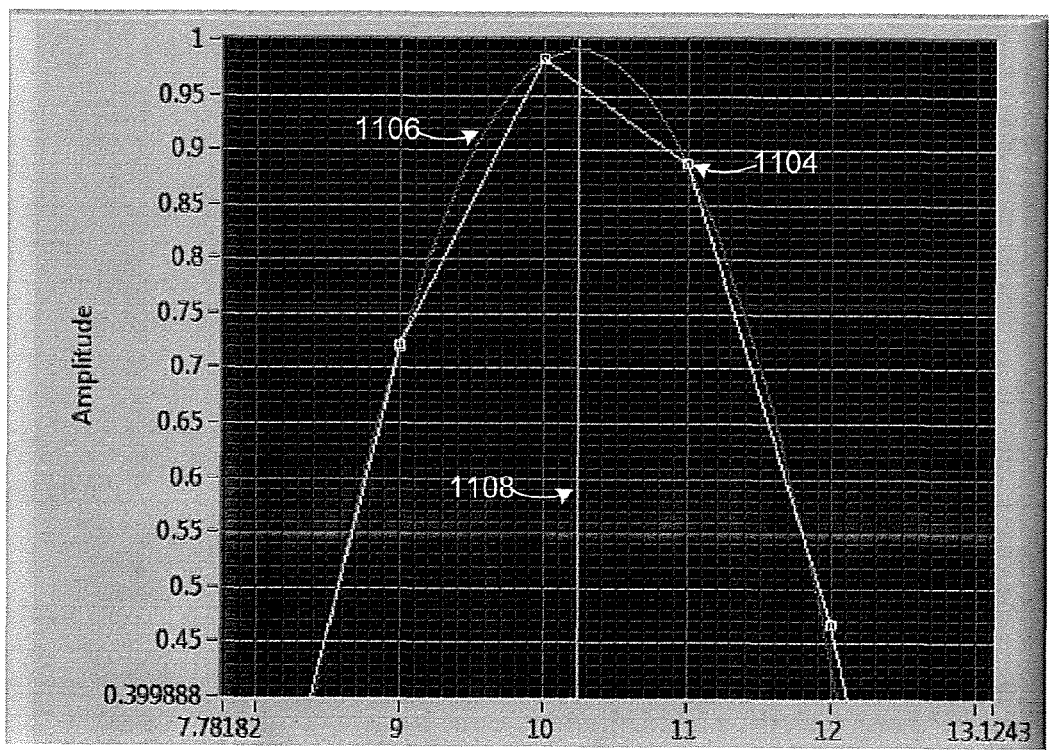

FIGS. 11A and 11B illustrate two graphs 1100-1102 that could be generated using the image of the texture shown in FIG. 5B. In FIG. 11A, the graph 1100 includes various discrete points 1104, which represent the values of a discrete auto-covariance function. As can be seen here, the first positive local maximum that is encountered when moving away from the origin occurs at a pixel distance of 10. The processing system 106 then fits a polynomial curve 1106 against the point 1104 at that pixel distance and its neighboring points 1104. The maximum value of the polynomial curve 1106 is denoted with a line 1108, which also represents the dominant texture size expressed in terms of pixels. In this example, the dominant texture size represents 10.2313 pixels. By calculating the distance per pixel, the dominant texture size can then be expressed as a length.

Note that the texture in FIG. 5A represents simulated grooves each having a width of 10 pixels and that the texture in FIG. 5B represents simulated grooves each having a width of 10.2 pixels. The examples shown in FIGS. 10A through 11B show that the technique described above can have a high accuracy, which in this example amounts to an accuracy of ±0.2 pixels. However, other accuracies can be obtained depending on the implementation.

Although FIGS. 7A through 11B illustrate examples of characterizing texture, various changes may be made to FIGS. 7A through 11B. For instance, these examples are for illustration only and do not limit the systems 100, 200 of FIGS. 1 and 2 or the method 600 of FIG. 6 to any particular implementation.

In some embodiments, various functions described above (such as functions for analyzing digital images and identifying texture sizes) are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
using at least one processing device:
obtaining a multi-dimensional image of a surface having a texture;
identifying multiple discrete auto-covariance functions of the multi-dimensional image, each discrete auto-covariance function identified using a different set of pixels in the multi-dimensional image;
averaging the multiple discrete auto-covariance functions to generate a final discrete auto-covariance function of the multi-dimensional image; and
identifying a dominant size of the texture using the final discrete auto-covariance function.

2. The method of claim 1, wherein identifying the dominant size of the texture comprises:
identifying a first positive local maximum of the final discrete auto-covariance function.

3. The method of claim 2, wherein:
the final discrete auto-covariance function comprises points associated with positive numbers of whole pixels;
the first positive local maximum of the final discrete auto-covariance function is identified at one of the points; and
identifying the dominant size of the texture further comprises performing sub-pixel estimation using the point associated with the first positive local maximum and one or more neighboring points.

4. The method of claim 3, wherein performing the sub-pixel estimation comprises:
fitting a polynomial curve to the point associated with the first positive local maximum and the one or more neighboring points; and
identifying a number of whole and fractional pixels associated with a maximum of the polynomial curve.

5. The method of claim 4, further comprising:
identifying a scale of the multi-dimensional image, the scale identifying a distance associated with each pixel of the multi-dimensional image; and
multiplying the number of whole and fractional pixels by the scale to identify a length of the dominant size of the texture.

6. The method of claim 1, further comprising:
pre-processing the multi-dimensional image prior to identifying the dominant size of the texture.

7. The method of claim 6, wherein pre-processing the multi-dimensional image comprises adjusting the multi-dimensional image to compensate for uneven illumination of the surface.

8. The method of claim 1, further comprising:
performing one or more optical, geometrical, or statistical corrections of the multi-dimensional image.

9. The method of claim 1, wherein the multi-dimensional image comprises a multi-dimensional image of a surface having a randomized texture.

10. The method of claim 1, wherein the multiple discrete auto-covariance functions of the multi-dimensional image are identified using pixels in different rows, columns, or radial directions of the multi-dimensional image.

11. An apparatus comprising:
at least one memory configured to store a multi-dimensional image of a surface having a texture; and
at least one processing device configured to:
identify multiple discrete auto-covariance functions of the multi-dimensional image, each discrete auto-covariance function identified using a different set of pixels in the multi-dimensional image;
average the multiple discrete auto-covariance functions to generate a final discrete auto-covariance function of the multi-dimensional image; and
identify a dominant size of the texture using the final discrete auto-covariance function.

12. The apparatus of claim 11, wherein the at least one processing device is configured to identify the dominant size of the texture by identifying a first positive local maximum of the final discrete auto-covariance function.

13. The apparatus of claim 12, wherein:
the final discrete auto-covariance function comprises points associated with positive numbers of whole pixels;
the at least one processing device is configured to identify the first positive local maximum of the final discrete auto-covariance function at one of the points; and
the at least one processing device is configured to identify the dominant size of the texture by performing sub-pixel estimation using the point associated with the first positive local maximum and one or more neighboring points.

14. The apparatus of claim 13, wherein the at least one processing device is configured to perform the sub-pixel estimation by:
fitting a polynomial curve to the point associated with the first positive local maximum and the one or more neighboring points; and
identifying a number of whole and fractional pixels associated with a maximum of the polynomial curve.

15. The apparatus of claim 14, wherein the at least one processing device is further configured to:
identify a scale of the multi-dimensional image, the scale identifying a distance associated with each pixel of the multi-dimensional image; and
multiply the number of whole and fractional pixels by the scale to identify a length of the dominant size of the texture.

16. The apparatus of claim 11, wherein the at least one processing device is further configured to pre-process the multi-dimensional image prior to identifying the dominant size of the texture.

17. The apparatus of claim 16, wherein the at least one processing device is configured to pre-process the multi-dimensional image to compensate for uneven illumination of the surface.

18. The apparatus of claim 11, wherein the at least one processing device is further configured to perform one or more optical, geometrical, or statistical corrections of the multi-dimensional image.

19. The apparatus of claim 11, wherein the multi-dimensional image comprises a multi-dimensional image of a surface having a randomized texture.

20. The apparatus of claim 11, wherein the at least one processing device is configured to identify the multiple discrete auto-covariance functions of the multi-dimensional image using pixels in different rows, columns, or radial directions of the multi-dimensional image.

21. A non-transitory computer readable medium containing a computer program, the computer program comprising computer readable program code that when executed causes at least one processing device to:
obtain a multi-dimensional image of a surface having a texture;
identify multiple discrete auto-covariance functions of the multi-dimensional image, each discrete auto-covariance function identified using a different set of pixels in the multi-dimensional image;
average the multiple discrete auto-covariance functions to generate a final discrete auto-covariance function of the multi-dimensional image; and
identify a dominant size of the texture using the final discrete auto-covariance function.

22. The non-transitory computer readable medium of claim 21, wherein the computer readable program code that when executed causes the at least one processing device to identify the dominant size of the texture comprises computer readable program code that when executed causes the at least one processing device to:
identify a first positive local maximum of the final discrete auto-covariance function, the final discrete auto-covariance function comprising points associated with positive numbers of whole pixels, the first positive local maximum of the final discrete auto-covariance function identified at one of the points; and
perform sub-pixel estimation using the point associated with the first positive local maximum and one or more neighboring points.

23. The non-transitory computer readable medium of claim 22, wherein the computer readable program code that when executed causes the at least one processing device to perform the sub-pixel estimation comprises computer readable program code that when executed causes the at least one processing device to:
fit a polynomial curve to the point associated with the first positive local maximum and the one or more neighboring points; and
identify a number of whole and fractional pixels associated with a maximum of the polynomial curve.

24. The non-transitory computer readable medium of claim 23, wherein the computer program further comprises computer readable program code that when executed causes the at least one processing device to:
identify a scale of the multi-dimensional image, the scale identifying a distance associated with each pixel of the multi-dimensional image; and
multiply the number of whole and fractional pixels by the scale to identify a length of the dominant size of the texture.

25. The non-transitory computer readable medium of claim 21, wherein the computer program further comprises computer readable program code that when executed causes the at least one processing device to:

pre-process the multi-dimensional image prior to identifying the dominant size of the texture.

26. The non-transitory computer readable medium of claim 21, wherein the computer program further comprises computer readable program code that when executed causes the at least one processing device to:
pre-process the multi-dimensional image to compensate for uneven illumination of the surface.

27. The non-transitory computer readable medium of claim 21, wherein the multi-dimensional image comprises a multi-dimensional image of a surface having a randomized texture.

28. The non-transitory computer readable medium of claim 21, wherein the computer readable program code that when executed causes the at least one processing device to identify the multiple discrete auto-covariance functions comprises computer readable program code that when executed causes the at least one processing device to:
identify the multiple discrete auto-covariance functions of the multi-dimensional image using pixels in different rows, columns, or radial directions of the multi-dimensional image.

* * * * *